United States Patent

Kawaguchi et al.

Patent Number: 5,151,001
Date of Patent: Sep. 29, 1992

[54] APPARATUS FOR ROTATING TOP ENDS OF CANS

[75] Inventors: Akira Kawaguchi; Tatsuyuki Suzuki, both of Asago; Michihito Yoshida, Suntou, all of Japan

[73] Assignee: Mitsubishi Materials Corporation, Tokyo, Japan

[21] Appl. No.: 482,983

[22] Filed: Feb. 22, 1990

[30] Foreign Application Priority Data

Feb. 22, 1989 [JP] Japan .................. 1-42089
Feb. 22, 1989 [JP] Japan .................. 1-42090
Feb. 23, 1989 [JP] Japan .................. 1-43779

[51] Int. Cl.⁵ .............................. B65H 1/00
[52] U.S. Cl. ...................... 414/225; 414/744.2; 414/797.1; 198/377; 198/803.15
[58] Field of Search ............. 414/744.2, 222, 225, 414/797.1; 198/377, 346.2, 803.15, 378, 379

[56] References Cited

U.S. PATENT DOCUMENTS

| | | | |
|---|---|---|---|
| 3,554,352 | 1/1971 | Hillman | 414/225 X |
| 4,220,237 | 9/1980 | Mohn | 198/377 |
| 4,246,300 | 1/1981 | Jensen | 198/377 X |
| 4,511,025 | 4/1985 | Nakayama | 198/377 |
| 4,799,846 | 1/1989 | Wissman et al. | 198/803.15 X |
| 4,822,232 | 4/1989 | Gantz et al. | 198/803.15 X |
| 4,974,716 | 12/1990 | Yuri et al. | 198/377 |

FOREIGN PATENT DOCUMENTS 2513976 4/1983 France .
2043014 10/1980 United Kingdom .

Primary Examiner—Robert P. Olszewski
Assistant Examiner—Cheryl L. Gastineau
Attorney, Agent, or Firm—Oblon, Spivak, McClelland, Maier & Neustadt

[57] ABSTRACT

In a rotating apparatus for top ends, a transport path for the top ends is defined along an outer periphery of a turntable which is rotatable intermittently. Top-end holding platforms are arranged on the outer periphery of the turntable in spaced relation to each other along the transport path so as to correspond to work stations. At least one of the top-end holding platforms is rotated about its axis relative to the turntable. The top-end holding platforms are movable together with the turntable about an axis thereof. Annular positioning grooves are formed respectively in upper faces of the top-end holding platforms. An annular projection of the top end is fitted in the positioning groove. A ventilation passageway has one end opening to the upper face of the top-end holding platform. A source of suction air is connected to the other end of the air-ventilation passageway.

26 Claims, 12 Drawing Sheets

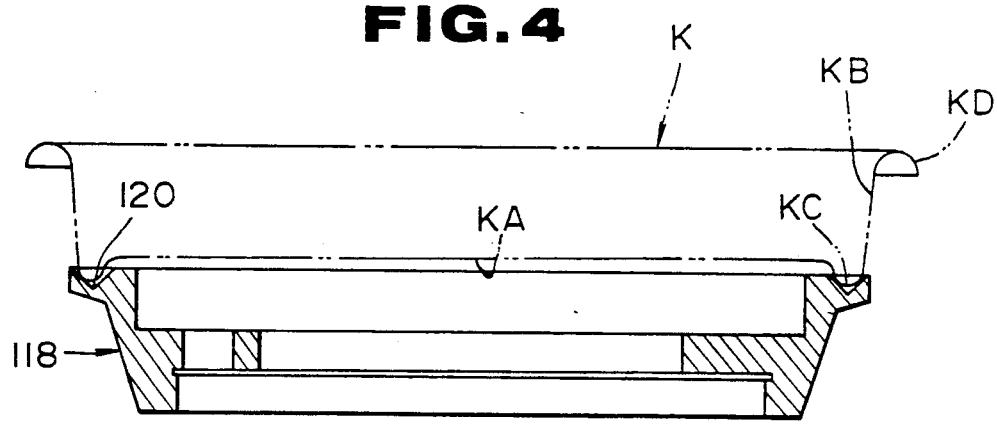
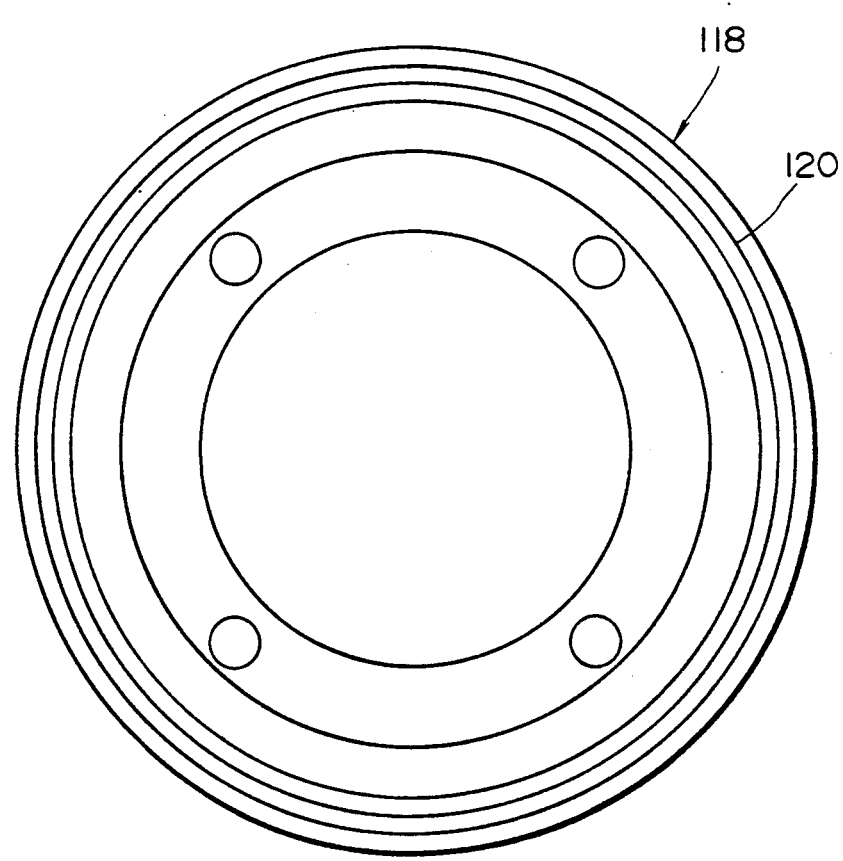

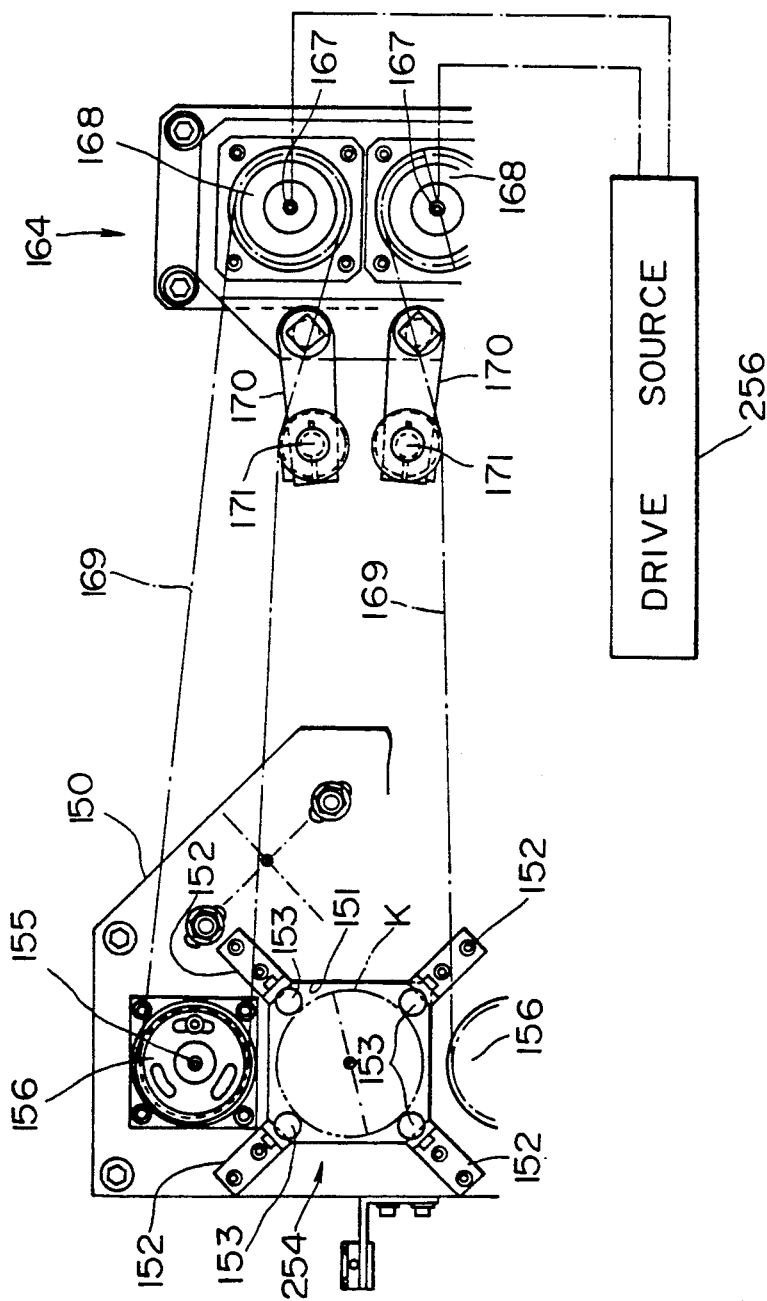

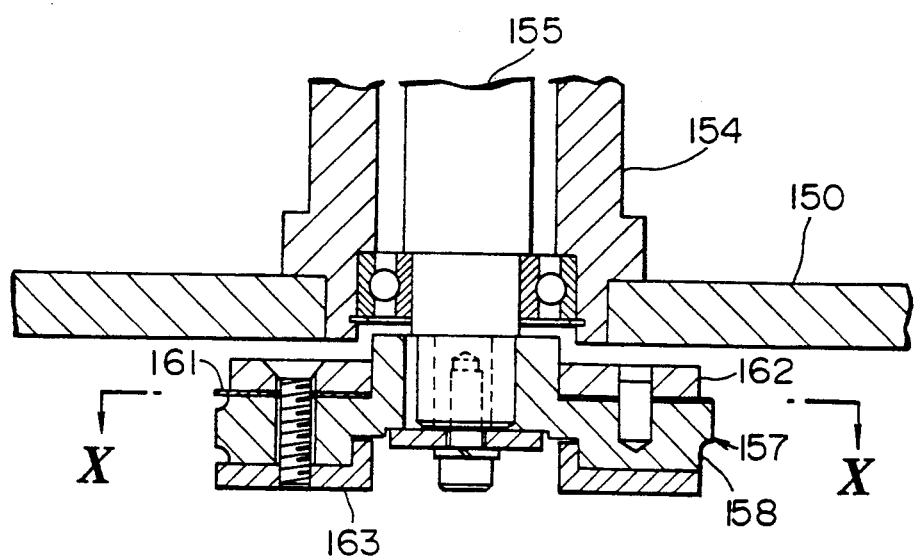
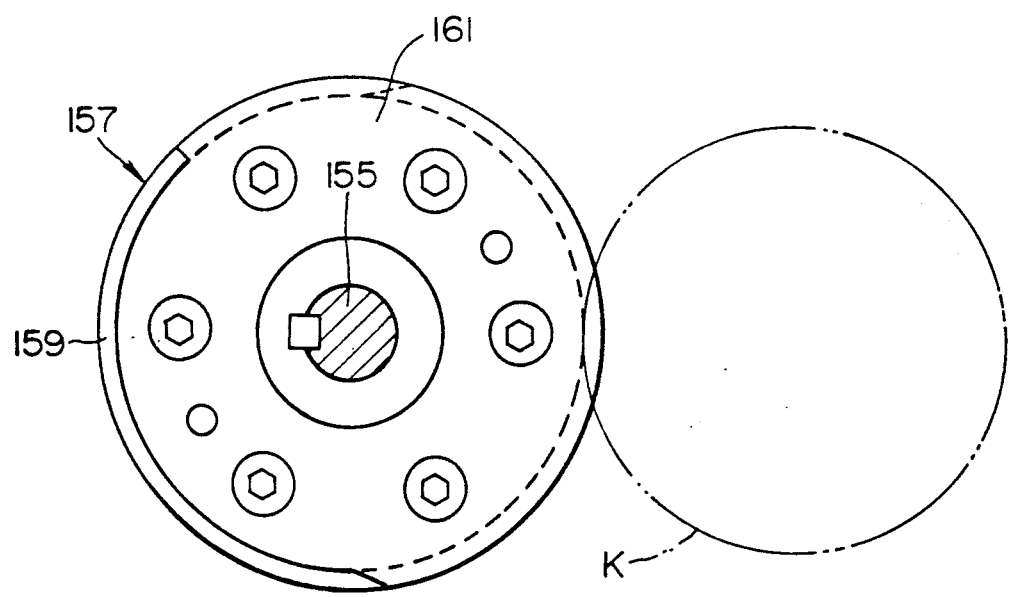

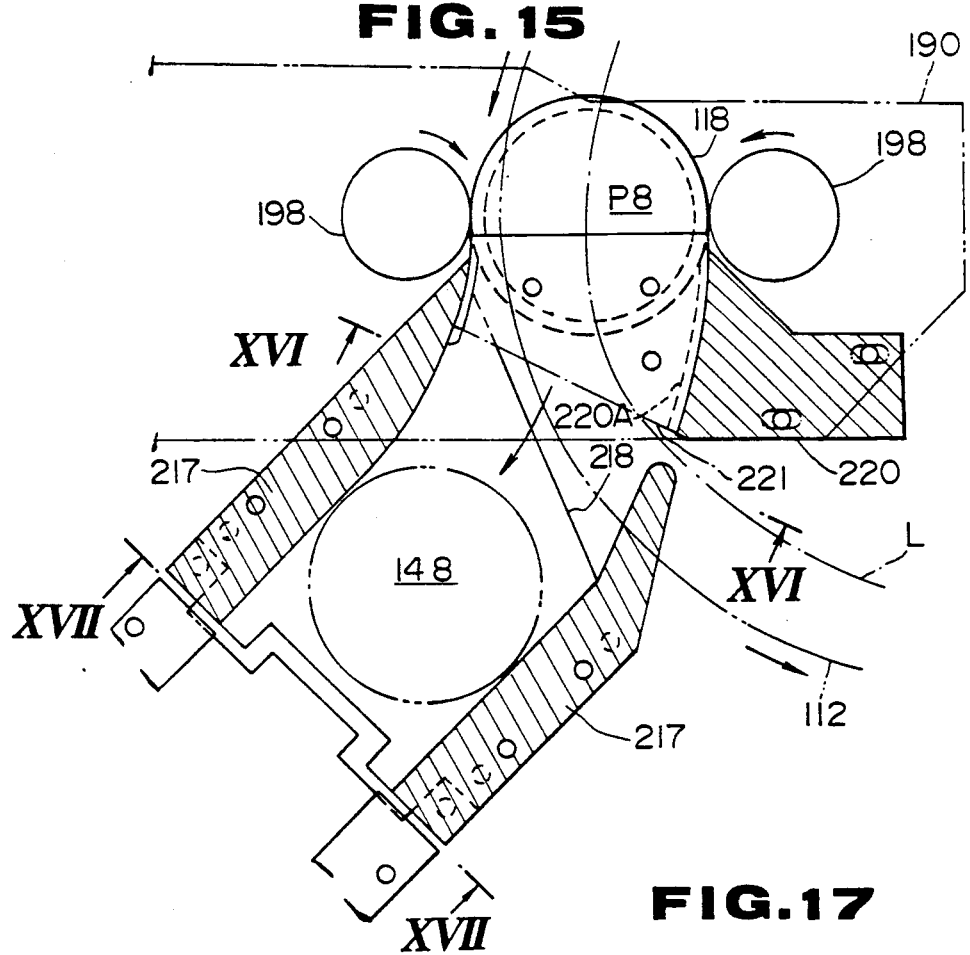
FIG. 15
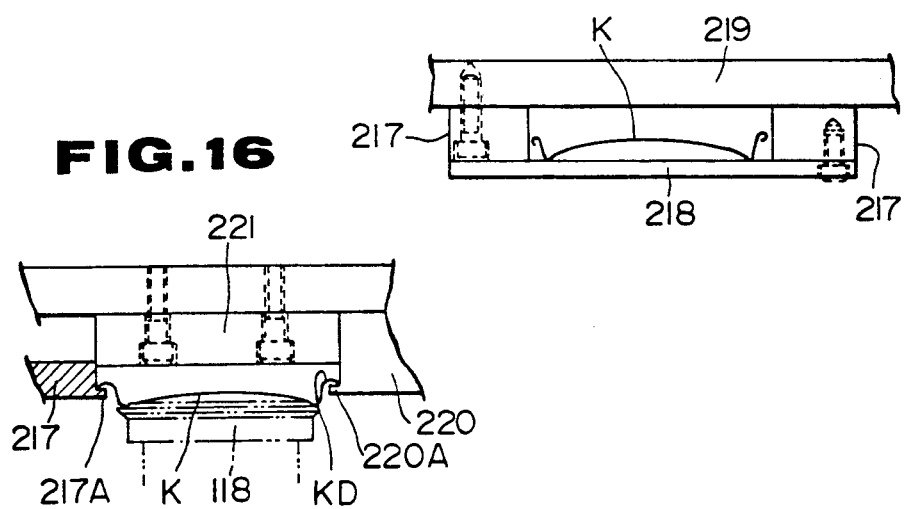
FIG. 16
FIG. 17

1

APPARATUS FOR ROTATING TOP ENDS OF CANS

BACKGROUND OF THE INVENTION

1. Field of the Invention

The present invention relates to a rotating apparatus for top ends of cans, which is utilized in, for example, automatic inspection of multiple features, such as external defects on the top ends, dimensional errors thereof, and so on, and more particularly to an improvement in the holding accuracy of the top ends of cans.

2. Prior Art

When manufacturing top ends of cans which are used for beverage containers, automatic inspection is essential for confirming dimensions of the manufactured top ends, existence of defects thereon, and an attached or fixed condition of retained caps mounted respectively on the top ends.

Conventionally, the top ends to be inspected are conveyed along a straight line by a conveyer or the like, and are inspected for their defects or the like by means of image processing devices arranged along the conveyer.

Each of the top-end holding platforms of the conventional rotating apparatus is constructed as shown in FIG. 18 or in FIG. 19. In this connection, a top end K has front and rear faces, and first and second annular projections KC and KD. The first annular projection KC is provided on the rear face and projects in an axial direction of the top end. A recess KA is defined by the first annular projection KC. The second annular projection KD like a flange is provided on the front face and projects perpendicularly to the axial direction. A recess KB is defined by the second annular projection KD. A retained cap R is formed on a bottom surface of the recess KB.

First, in the rotating apparatus shown in FIG. 18, a top-end holding platform 1 is formed at its upper face with a projection 1A which is fitted without gaps in the recess KA in the rear face of the top end K, and the top end K is centered by the projection 1A.

On the other hand, a top-end holding platform 11 shown in FIG. 19 is formed at its upper face with a projection 11A which is fitted without gaps in the recess KB in the front face of the top end K. The top end K is held on the top-end holding platform 11 in a reverse fashion, and is centered by the projection 11A.

Any of the conventional top-end holding platforms shown in FIGS. 18 and 19 are constructed such that the top end K is centered by the projection 1A or 11A. Because of such construction, in order to obtain sufficient accuracy, the projection 1A or 11A must be formed into such dimensions that the projection 1A or 11A is in close contact with a peripheral wall surface of the recess KA or KB. However, this produces the following disadvantage. That is, if the projection 1A or 11A is set to such strict or precise dimensions, a higher accuracy is required to cause the top end K to rest on the top-end holding platform 1 or 11 and to manufacture dies for molding the top end K. so that there is difficulty in supplying the top end to the top-end holding platform 1 or 11 and in manufacturing the top end K itself. For this reason, it is difficult to improve the centering accuracy of the top end K at inspection, and therefore the top-end holding platform 1 or 11 cannot accommodate recent trends toward ever-improving precision.

Furthermore, in the construction shown in FIG. 19 in which the top end K is held on the top-end holding platform 11 in a reverse fashion, it is impossible to confirm the fixed state of the retained cap R, which is one of the important inspected features. For this reason, inspection of the fixed condition of the retained cap R must be carried out separately, resulting in poor efficiency.

In addition, the above-described rotating apparatus comprises a top-end supply device provided for individually and successively supplying a plurality of top ends stacked one upon the other, from one thereof which is located at the front row, to feed the top ends to various inspecting instruments.

Conventionally, the operating speed of the rotating apparatus has been relatively low. Accordingly, in the supply of the top ends to the various inspecting instruments, the top ends have been delivered horizontally by a feeder or the like so that the top ends are supplied one by one to the inspecting instruments.

In recent years, however, in order to improve productivity, consideration is being given to instruments for automatically inspecting top ends continuously at high speed, that is, at several hundreds of top ends per minute, which is considerably faster than the conventional speed.

For the reason discussed above, the top-end supply device in which top ends are fed one by one horizontally by a feeder, or the like, have a limited operating speed. Thus, it is difficult to follow the high speed of the rotating apparatus.

Furthermore, the above rotating apparatus includes a top-end ejection device provided for ejecting the inspected top ends to a subsequent step at high speed.

The ejection device comprises an actuator such as a pneumatic cylinder, or the like mounted on the lateral side of a transport path defined along the outer periphery of the turntable, and the top ends are pushed out of the transport path into and along an ejection passage.

In the top-end ejection device in which reciprocal movement of the actuator causes the top ends to be ejected into the ejection passage, however, the pushing operation of the actuator with respect to the top ends must be quickly accompanied by an increase in the operating speed of the rotating apparatus. Accordingly, there is a concern that top ends may be damaged due to the impact of the reciprocal movement of the actuator. Further, vibration and noise from the ejection device are severe, and the cost required for driving the ejection device increases. Thus, a high-speed ejection device for the top ends, which is fundamentally new, is necessary.

SUMMARY OF THE INVENTION

It is therefore an object of the invention to provide a rotating apparatus which is capable of increasing centering accuracy of top ends with respect respectively to top-end holding platforms.

It is another object of the invention to provide a rotating apparatus which is capable of successively supplying at high speed a plurality of top ends one by one.

It is yet another object of the invention to provide a rotating apparatus which is capable of ejecting a plurality of top ends at high speed.

According to the invention, there is provided a rotating apparatus for a plurality of top ends, each of the top ends having a first annular projection projecting in an axial direction thereof and a second annular projection projecting radially outwardly thereof, the rotating apparatus comprising:

a turntable disposed so as to be rotatable intermittently about an axis thereof and defining a transport path for the top ends along an outer periphery thereof;

a plurality of stationary work stations arranged along the transport path in spaced relation to each other;

a plurality of top-end holding platforms arranged on the outer periphery of the turntable in circumferentially spaced relation to each other along the transport path so as to correspond to the work stations, respectively, and being movable together with the turntable about the axis thereof along the transport path, at least one of the top-end holding platforms being rotatable about an axis thereof relative to the turntable;

means for rotating the at least one top-end holding platform about the axis thereof;

each of the top-end holding platforms having an annular positioning groove formed in an upper face thereof for receiving the annular projection of the top end;

ventilation passage means having one end opening to the upper face of the top-end holding platform; and suction-air source means connected to the other end of the ventilation passage means.

In the above rotating apparatus, the first annular projections of the respective top ends are fitted respectively in the annular positioning grooves formed respectively in the upper faces of the top-end holding platforms, and air is drawn from the upper faces of the respective top-end holding platforms by the air-suction source means to draw the top ends respectively toward the top-end holding platforms. By suction force due to the air suction, each of the first annular projections slides along opposite side faces of a corresponding one of the annular positioning grooves, so that shift or deviation of the first annular projections with respect to the annular positioning grooves are corrected in position along the entire peripheries thereof. Thus, even if the holding accuracy of the top ends at supply is more or less inferior, it is possible to accurately center the top ends with respect to the top-end holding platforms. Accordingly, quality inspection and the like are done at high accuracy. Further, if the top ends are held respectively on the top-end holding platforms in such a manner that the front faces of the respective top ends are oriented upwardly, there is also such an advantage that the retained caps or the like on the respective top ends can be inspected simultaneously.

Preferably, the above-described rotating apparatus further includes a top-end supply device located at a top-end supply station, the top-end supply device comprising:

holder means having a top-end outlet for holding the plurality of top ends in such a manner that the top ends are stacked upon each other and are movable along a direction of the stacking;

a plurality of feed-cam means arranged in spaced relation to each other and in parallel relation to the turntable with the transport path located between the plurality of feed-cam means, the feed-cam means being rotatable about their respective axes and having their respective front and rear faces; and rotating means for rotating the plurality of feed-cam means about their respective axes, wherein the plurality of feed-cam means have their respective outer peripheral surfaces in which a plurality of grooves inclined with respect to the front faces of the respective feed-cam means are formed respectively, each of the inclined grooves extending from the front face to the rear face of a corresponding one of the plurality of feed-cam means and having a width in which the second annular projection of a corresponding one of the top ends is fitted, whereby rotation of the plurality of feed-cam means causes the second annular projection of a first one of the top ends, which is located nearest the plurality of feed-cam means, to be fitted simultaneously in the inclined grooves formed in the outer peripheral surfaces of the respective feed-cam means.

In the above rotating apparatus, the plurality of feed-cam means are rotated such that the inclined grooves in the respective feed-cam means advance the top ends toward their delivery direction. Accordingly, the second projection of one of the top ends, which is located at the front row and is sandwiched between the plurality of feed-cam means, is fitted in the inclined grooves in the respective feed-cam means. The top end, which is located at the front row, is separated from the remaining top ends and is fed along the inclined grooves. Thus, only rotation of the plurality of feed-cam means at a predetermined speed ensures that the top ends stacked upon each other can be fed one by one at a constant or predetermined cycle. Thus, operational reliability is high. Furthermore, if rotational speed of the plurality of feed-cam mean sis changed or varied, it is possible to optionally alter supply spacing or interval between the top ends. Thus, the rotating apparatus can easily cope with high speediness. Furthermore, the rotating apparatus has such advantages that, since the construction is simple, the cost is low, and a fear of trouble is also low.

Preferably, the above-mentioned rotating apparatus further includes a top-end ejection device located at a top-end ejection station, the top-end ejection device comprising:

ejection passage means arranged stationary relative to the turntable at a position adjacent to the top-end ejection station;

a pair of feed-roller means arranged in spaced relation to each other and in parallel relation to the turntable with the transport path located between the pair of feed-roller means, the pair of feed-roller means being rotatable about their respective axes, the pair of feed-roller means having their respective outer peripheral surfaces which are so set as to be abutted simultaneously against the second annular projection on the front face of each of the top ends; and rotating means for rotating the pair of feed-roller means in their respective directions opposite to each other, whereby rotation of the pair of feed-roller means causes the top end, which is located at the top-end ejection station, to be ejected into and along the ejection passage means.

In the above rotating apparatus, the pair of feed roller means, which are located at both sides of the transport path, are rotated in their respective directions opposite to each other, and the top ends transported along the transport path are successively introduced between the pair of feed-roller means. At the moment, frictional force due to rotation of the pair of feed-roller means causes the top ends to be sprung out in the tangential direction of the rotation, to the subsequent step at high speed. Thus, it is possible to eject the top ends regardless of speed at which the top ends are conveyed along the transport path, and regardless of spacing at which the top ends are conveyed along the transport path. Accordingly, it is possible to easily cope with ejection of the top ends even if processing speed of the previous step is fast. Furthermore, since frictional force in the tangential direction is applied to the outer peripheral surfaces of the respective top ends, impact at ejection is considerably low as compared with a construction in which the top ends are ejected perpendicular to the outer peripheral surfaces of the respective top ends. Accordingly, there is no such fear that the top ends are damaged. Moreover, since the pair of feed-roller means should always be rotated, the construction is simple, noise is low, and the cost is also low.

BRIEF DESCRIPTION OF THE DRAWINGS

FIG. 4 is an enlarged cross-sectional view of the top-end holding platform illustrated in FIG. 3;

FIG. 5 is a top plan view of the top-end holding platform illustrated in FIG. 4;

FIG. 8 is a fragmentary top plan view of the top-end supply device illustrated in FIG. 7;

FIG. 9 is a vertical cross-sectional view of one of a pair of feed cams of the top-end supply device illustrated in FIG. 8;

FIG. 10 is a view of the feed cam, as viewed from X—X in FIG. 9;

FIG. 15 is a top plan view showing an ejection passage of the top-end ejection device illustrated in FIG. 13;

FIG. 16 is a cross-sectional view taken along the line XVI—XVI in FIG. 15;

FIG. 17 is a view of the ejection passage, as viewed from the arrows XVII—XVII in FIG. 15;

DESCRIPTION OF THE PREFERRED EMBODIMENTS OF THE INVENTION

Figure 1:
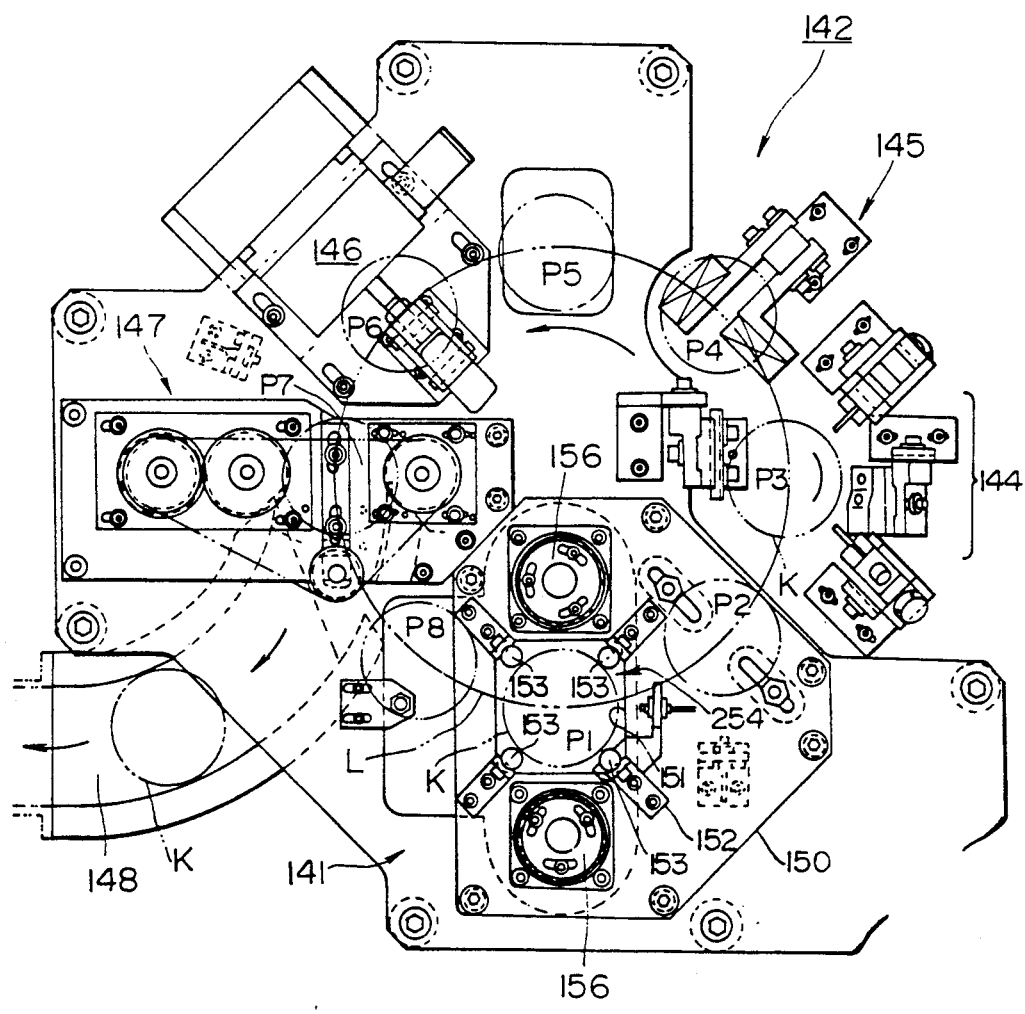
FIG. 1 is a top plan view of a rotating apparatus according to an embodiment of the invention.
Figure 18:
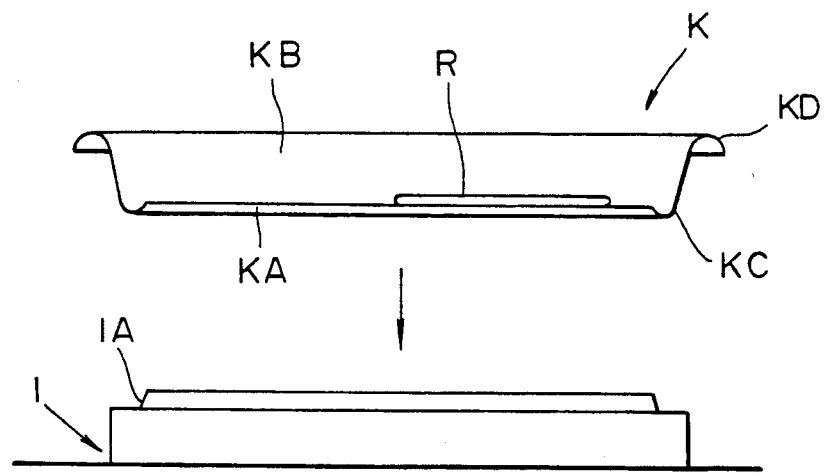
FIG. 18 is a schematic view of a top-end holding platform of the conventional rotating apparatus.
Figure 19:
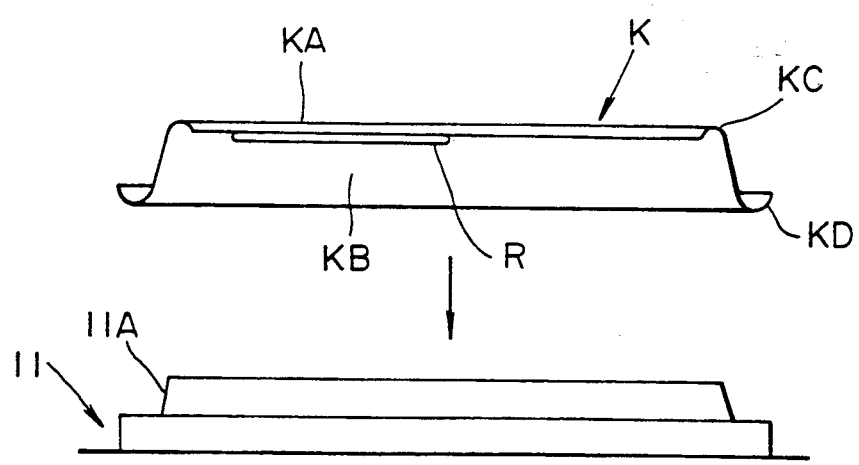
FIG. 19 is a schematic view of a top-end holding platform of another conventional rotating apparatus.

Referring to FIG. 1, there is shown, in plan view, a rotating apparatus, generally designated by the reference numeral 142, for a plurality of top ends K of cans, according to an embodiment of the invention. Each of the top ends K is of the same construction as that illustrated in FIGS. 18 and 19, and the detailed description of the top end K will be omitted to avoid repetition.

The entire rotating apparatus 142 will first be described briefly.

The rotating apparatus 142 comprises a top-end supply device 141 and a top-end ejection device 147. A turntable 112 (refer to FIG. 2) is provided which is rotatable intermittently about it axis and which is arranged horizontally. A circular transport path L for the top ends K is defined along an outer periphery of the turntable 112. There are provided a plurality of stationary work stations P1 through P8 which include a top-end supply station P1, a top-end ejection station P7 and six work stations P2 through P6 and P8. The work stations P1 through P8 are arranged along the transport path L in equidistantly spaced relation to each other. The top-end supply station P1 and the top-end ejection station P7 are located adjacent to each other with the work station P8 interposed therebetween.

Figure 2:
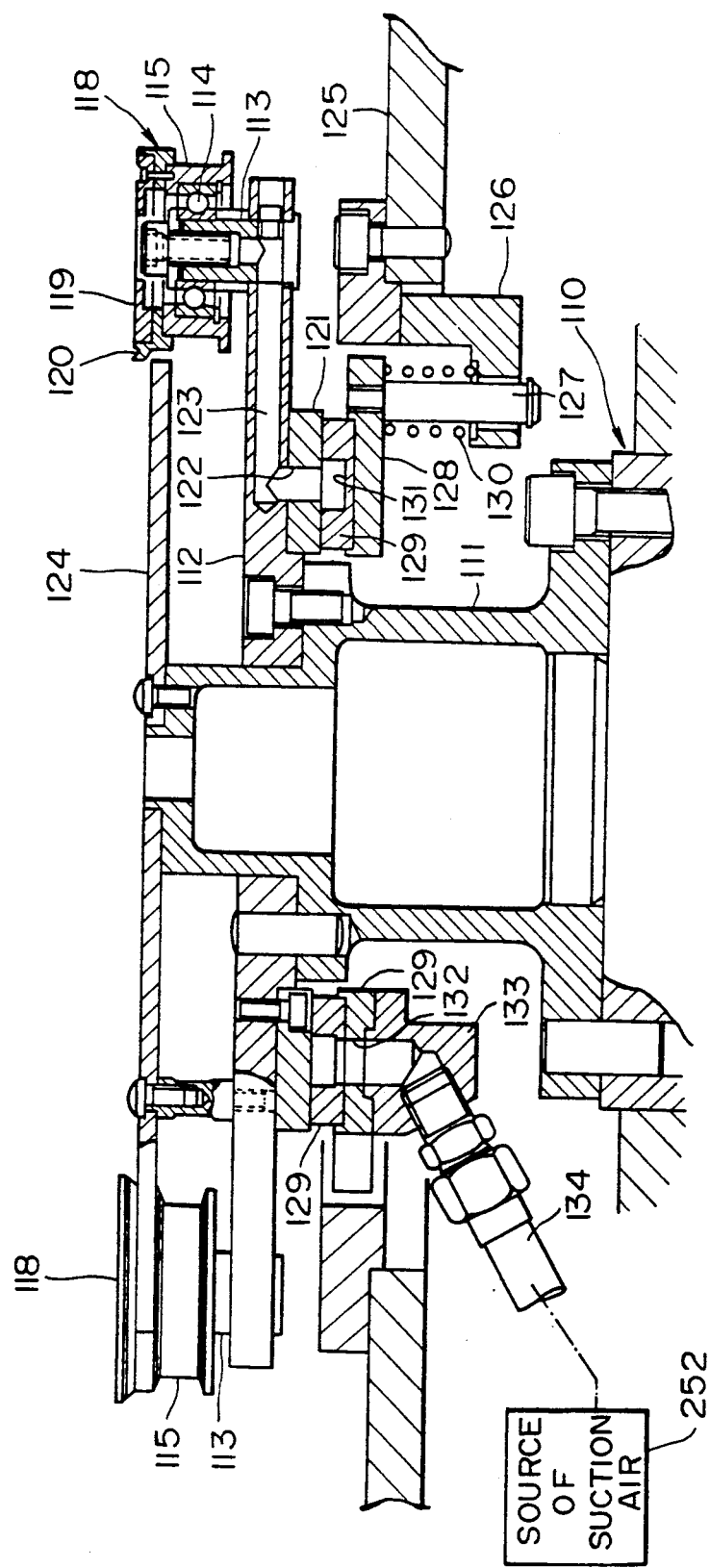
FIG. 2 is a vertical cross-sectional view of the rotating apparatus illustrated in FIG. 1.
Figure 3:
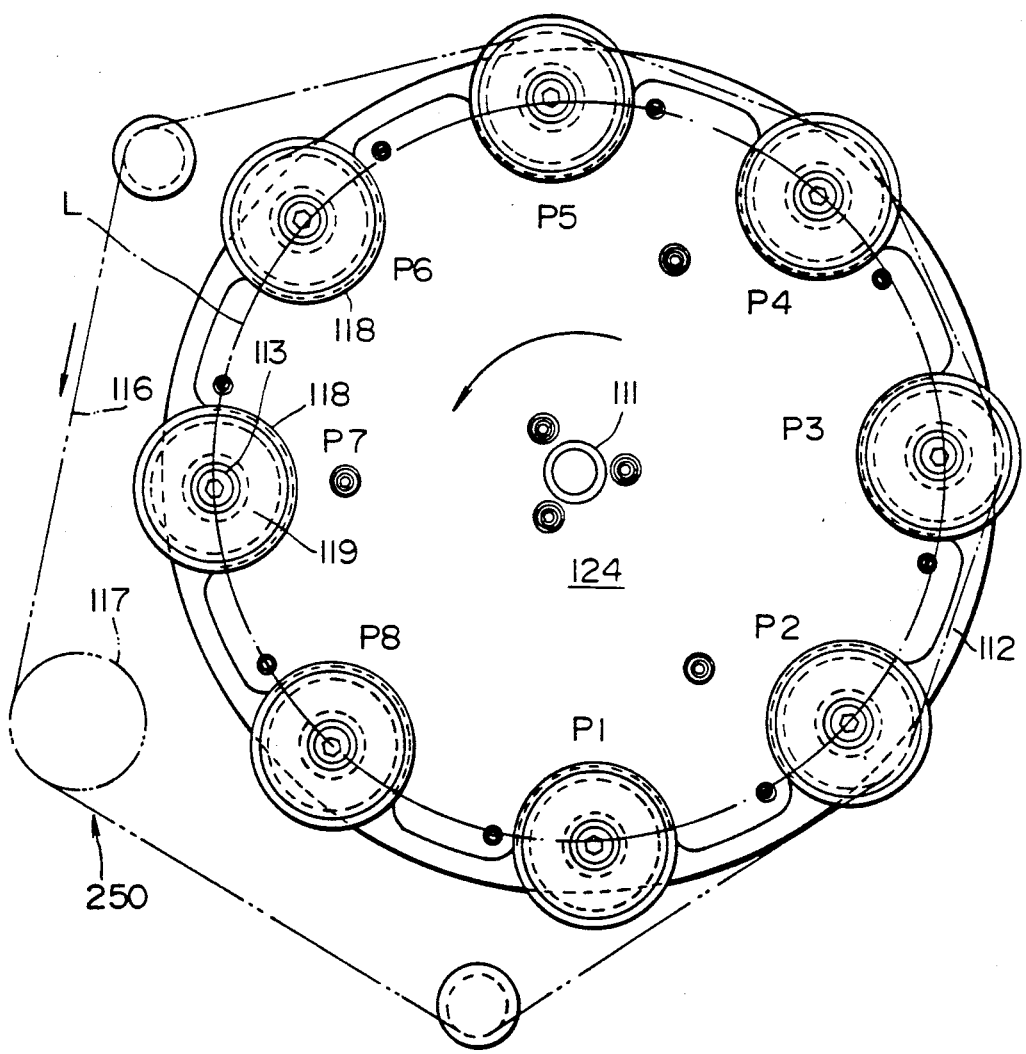
FIG. 3 is a plan view of the rotating apparatus illustrated in FIG. 1, showing a plurality of top-end resting tables.

As shown in FIGS. 2 and 3, a plurality of top-end holding platforms 118 are arranged on the outer periphery of the turntable 112 in equidistantly spaced relation to each other along the transport path L at their respective positions corresponding respectively to the work stations P1 through P8. The top-end holding platforms 118 are rotatable about their respective axes relative to the turntable 112, and are movable together with the turntable 112 about the axis thereof along the transport path L. Upper faces of the respective top-end holding platforms 118 are disposed parallel to the turntable 112.

The top ends K, individually supplied by the top-end supply device 141, rest respectively on the holding platforms 118 which are arranged along the outer periphery of the turntable 112. The turntable 112 is intermittently rotated about its axis, while the top-end holding platforms 118 are rotated about their respective axes. As shown in FIG. 1, a plurality of inspecting devices 144 and 145 and a discharge device 146 for discharging defected top ends, which are located at the work stations P3, P4 and P6, respectively, inspect or check dimensions of the top ends K, external defects thereof, a fixed condition of the opening rings R on the bottoms of the top ends K, and so on. Subsequently, the top ends K of good quality are ejected by the top-end ejection device 147 along an ejection passage 148 which is arranged stationary relative to the turntable 112 at a position adjacent the top-end ejection station P7. The ejection passage 148 extends tangentially of the transport path L.

Specifically, as shown in FIG. 2, a rotor 110 is horizontally rotated intermittently by a drive source (not shown). A rotary shaft 111 is fixedly mounted to the center of an upper face of the rotor 110 in an upright manner. The turntable 112 in the form of a disc is fixedly mounted horizontally to an intermediate portion of the rotary shaft 111. A plurality of hollow cylindrical shafts 113 (eight in this embodiment) are fixedly mounted to an outer periphery of the turntable 112 in circumferentially equidistantly spaced relation to each other. A plurality of pulleys 115 are rotatably mounted respectively to the cylindrical shafts 113 through respective bearings 114. As shown in FIG. 3, a drive mechanism 250 rotates the top-end holding platforms 118 about their respective axes, which are located respectively at the work stations P2 through P7. The drive mechanism 250 comprises a drive pulley 117. An endless belt 116 driven by the drive pulley 117 is wound about the pulleys 115 of the top-end holding platforms 118. The pulleys 115, except for those located at the stations P1 and P6 to P8, are rotated in the same direction. That is, the top-end holding platforms 118, which are located respectively at the top-end supply station P1 and the top-end ejection station P8, are kept stationary.

Referring to FIG. 2, the annular or ring-shaped top-end holding platform 118 is fixedly mounted to an upper face of each of the pulleys 115. An annular plate 119 made of resin material is fitted in the inner periphery of the top-end holding platform 118. As shown in FIGS. 4 and 5, a plurality of annular positioning grooves 120 are formed respectively in the upper faces of the respective top-end holding platforms 118. The first annular projections KC on the rear faces of the respective top ends K are fitted respectively in the annular positioning grooves 120 in the upper faces of the respective top-end holding platforms 118 along entire lengths of the annular projecting grooves 120. Each of the annular positioning grooves 120 is continuous peripherally of the upper face of a corresponding one of the top-end holding platforms 118. The annular positioning groove 120 has a generally V-shape in cross-section, and has its width in the upper face of the top-end holding platforms 118, which is larger than that of the first annular projection KC on the rear face of the top end K. The annular positioning groove 120 has opposite side faces which are equal to each other in an angle defined between each of the side faces and a circular center line therebetween which extends perpendicularly to the upper face of the top-end holding platform 118. The center line between the side faces of the annular positioning groove 120 is in agreement with a circular center line of the first annular projection KC on the rear face of the top end K, which extends perpendicularly to the rear face of the top-end holding platform 118. That is, the center line between the side faces of the annular positioning groove 120 is in agreement vertically with the center line of the first annular projection KC. It is desirable that an angle defined between the side faces of the annular positioning groove 120 be approximately 70° through 100°. If the angle is less than 70°, the width of the annular positioning groove 120 becomes small so that accuracy is required when the top end K is fitted in the annular positioning groove 120. If the angle is much larger than 100°, sufficient centering accuracy cannot be obtained.

Referring back to FIG. 2, a slide plate 121 in the form of an annular plate, is fixedly mounted to a lower face of the turntable 112. A plurality of ventilation ports 122 are formed in the slide plate 121 at positions corresponding respectively to the cylindrical shafts 113. A plurality of air ventilating passages 123 are formed within the turntable 112. The interiors of the cylindrical shafts 113 and the plurality of ventilation ports 122 communicate with each other respectively through the air ventilating passages 123 in an air-tight manner. A circular top plate 124 is fixedly mounted horizontally to an upper end of the rotary shaft 111 at an elevation substantially the same as the top-end holding platforms 118.

On the other hand, a base 125 is arranged horizontally and stationary, and surrounds the rotary shaft 111. A plurality of guide bars 127 are mounted vertically to a peripheral edge of an opening in the base 125 in such a manner that the guide bars 127 are slidable in the vertical direction. The guide bars 127 are spaced from each other peripherally of the base 125. An air ventilating plate 129 is fixedly mounted to upper ends of the respective guide bars 127. The ventilating plate 129 is abutted against the lower face of the sliding plate 121 through a support plate 128. A plurality of springs 130 are arranged respectively about outer peripheries of the guide bars 127. The ventilating plate 129 is urged against the sliding plate 121 by the springs 130.

Figure 6:
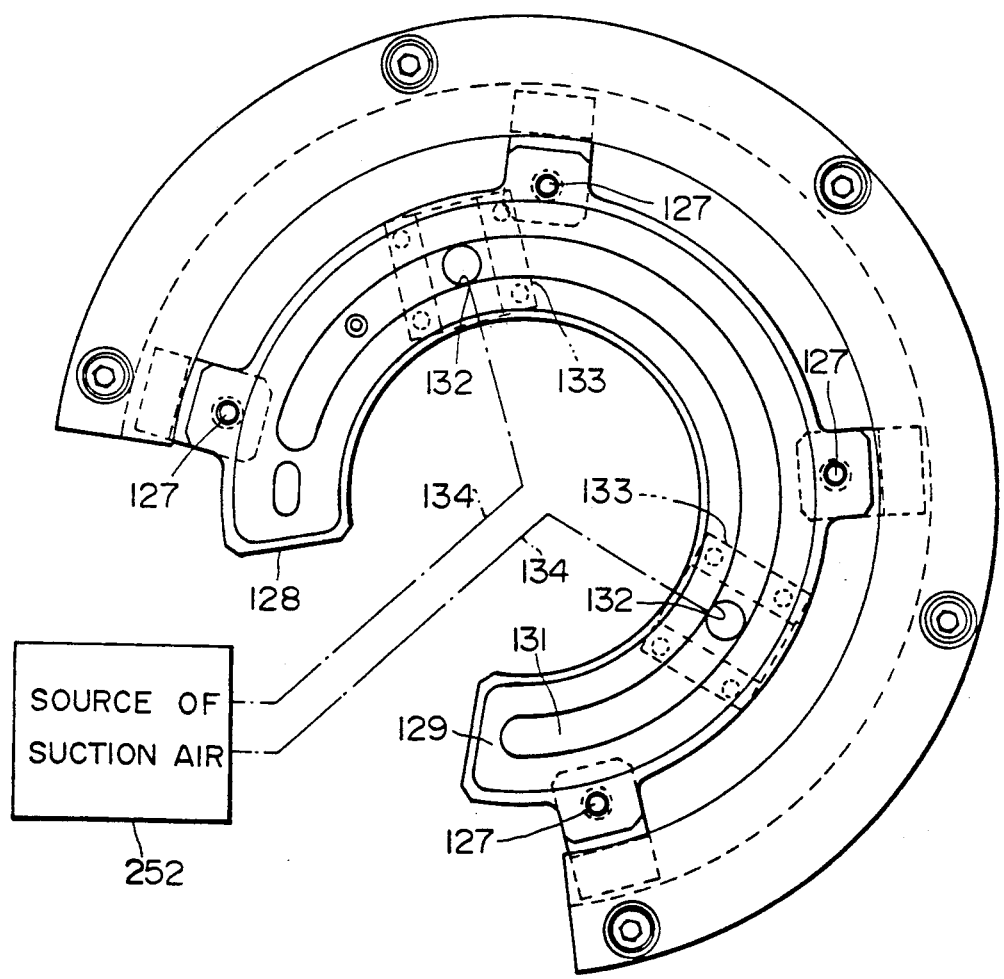
FIG. 6 is a top plan view of a C-shaped ventilating plate of the rotating apparatus illustrated in FIGS. 1 and 2, showing a ventilating passage.

The ventilating plate 129 is C-shaped and is superimposed on the sliding plate 121 along its entire length, as shown in FIG. 6. An air-ventilating groove 131 is formed in the upper face of the ventilating plate 129 along substantially its entire length. The ventilating groove 131 is C-shaped and extends about the axis of the turntable 112. The ventilating groove 131 communicates with all of the ventilation ports 122 except for those of the top-end holding platforms 118 which are located respectively at the stations P7 and P8.

A pair of bores 132 are formed in the ventilating plate 129, and communicate with two locations at the bottom of the ventilating groove 131. A pair of suction pipes 134 and 134 have their respective one ends which are connected to the bores 132 by respective connecting members 133. The suction pipes 134 have their respective other ends which are connected to a suction air source such as an evacuation pump 252.

In operation of the rotating apparatus constructed as above, the top end K is positioned and rests on the top-end holding platform 118 which is stationary at the top-end supply station P1. Then, the turntable 112 is intermittently rotated. In the positioning of the top end K, the first annular projection KC on the rear face of the top end K is fitted in the annular positioning groove 120. In the beginning, it is unnecessary that the first annular projection KC be accurately positioned at the center of the positioning groove 120, but the supply of the top ends K may be relatively imprecise.

However, the air-ventilating port 122 in the sliding plate 121 is communicated with the air-ventilating groove 131 in the air-ventilating plate 129. Thus, the top end K is drawn against the top-end holding platform 118 through the air-ventilating passage 123 and the hollow cylindrical shafts 113. Subsequently, the turntable 112 is intermittently rotated, and the top-end holding platform 118, on which the top end K rests, moves to the station P2. Furthermore, simultaneously, the endless belt 116 is abutted against the pulley 115 to rotate the top end K. Accordingly, even if there is a slight shift or deviation in the resting condition of the top end K, the first annular projection KC thereon moves along the opposite side faces of the positioning groove 120 in the top-end holding platform 118 so that the shift or deviation of the top end K is corrected along the entire periphery of the first annular projection KC. Thus, the top end K is correctly centered with respect to the annular positioning groove 120.

Subsequently, the outer dimensions of the respective top ends K, the fixed condition of the opening rings R thereon, absence of defects on the top ends K, and so on are inspected by the various inspecting instruments 144 and 145 at the stations P3 and P4. Subsequently, the top end K is delivered by the ejection device 147 at the ejection station P7 to the subsequent step.

As described above, in the rotating apparatus constructed as above, even if the positional accuracy of the top end K at supply thereof is relatively poor, an action due to the positioning groove 120 formed in the top-end holding platform 118 and the suction mechanism enables the top end K to be correctly centered on the top-end holding platform 118 at inspection. Thus, high-precision measurement is made possible. Further, since the top end K rests on the top-end holding platform 118 under such a condition that the front face of the top end K is oriented upwardly, inspection of the opening rings R is also easy. Moreover, in the above embodiment, suction is not provided to the top-end holding platforms 118 which are located respectively at the ejection station P7 and the last station P8 by the action of the sliding plate 121 and the air-ventilating plate 129. Accordingly, there is such an advantage that ejection of the top ends K to the subsequent step can smoothly be conducted.

The top-end supply device 141 located at the top-end supply station P1 will next be described in detail with reference to FIGS. 7 through 12.

Figure 7:
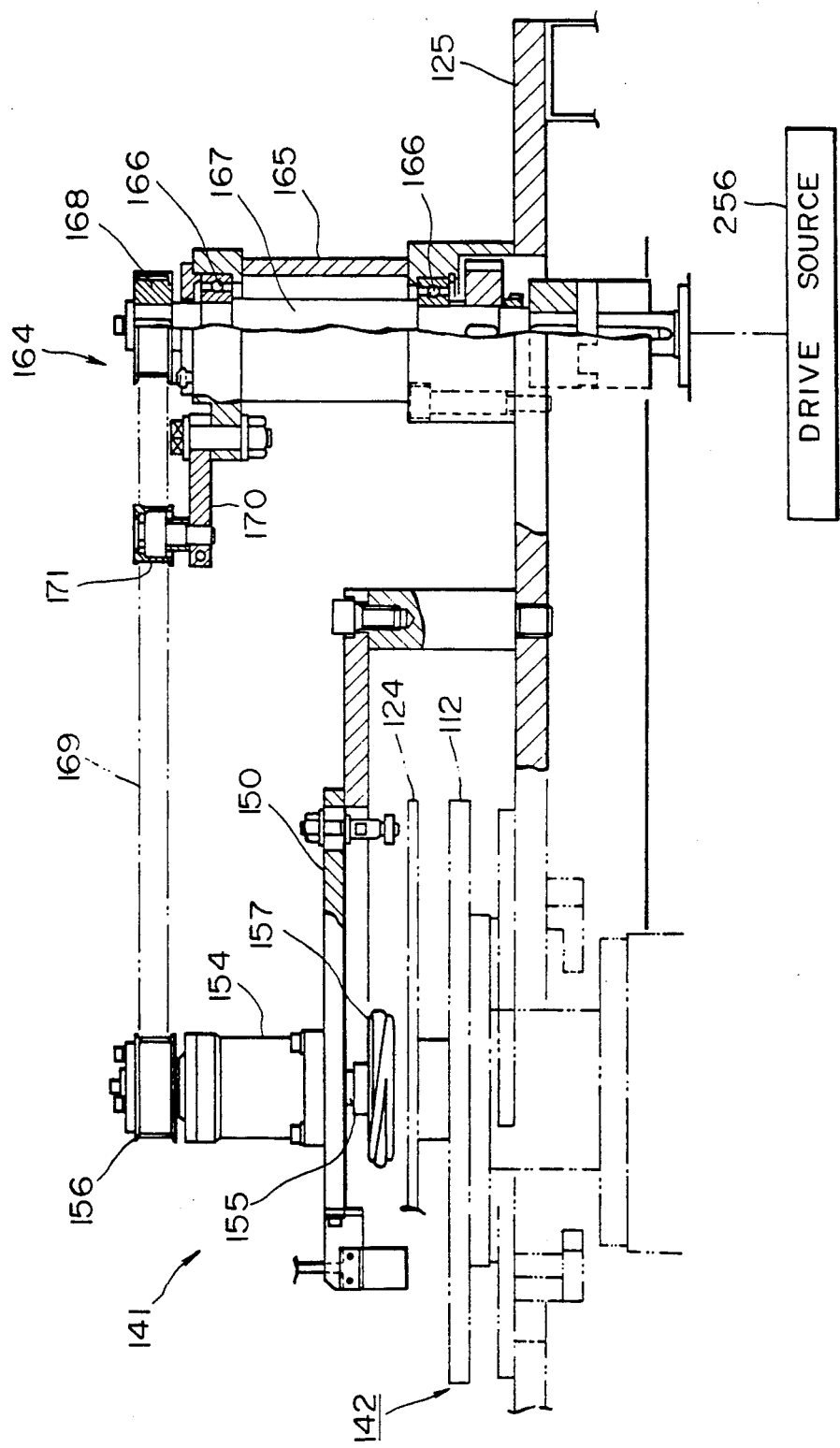
FIG. 7 is a vertical cross-sectional view of a top-end supply device of the rotational apparatus illustrated in FIG. 1.
Figure 11:
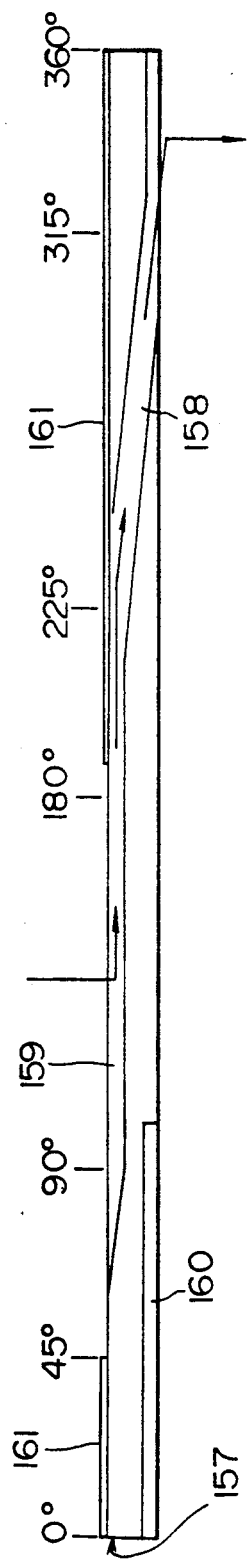
FIG. 11 is a developed view of the feed cam illustrated in FIGS. 8 and 9.
Figure 12:
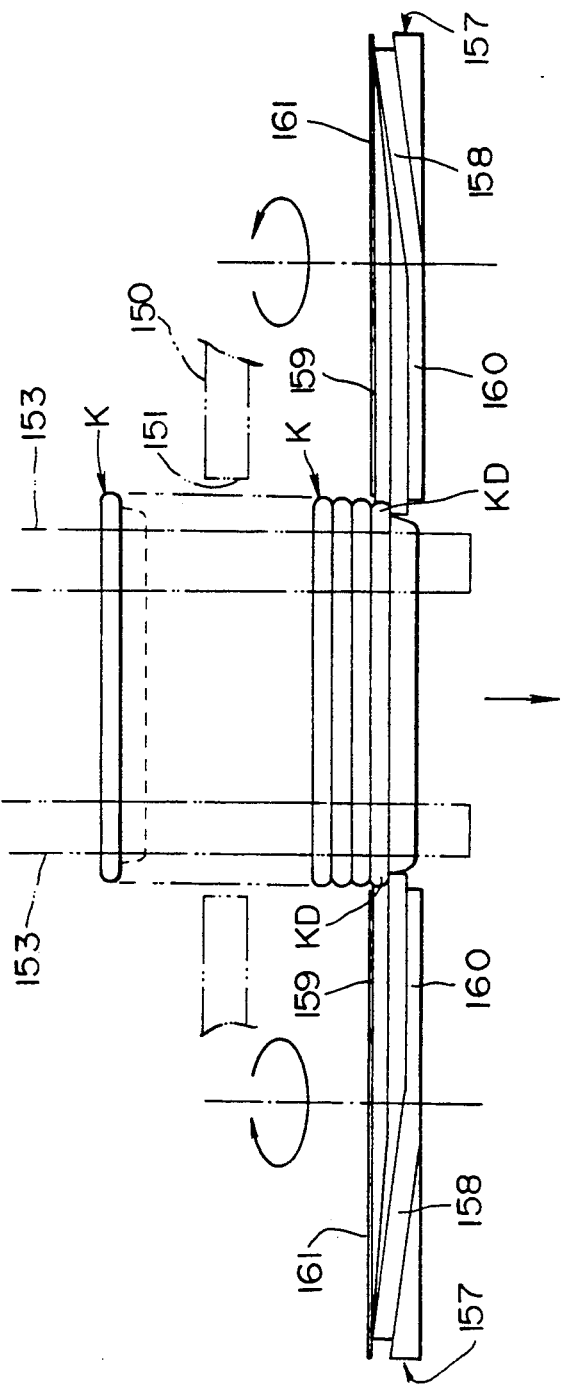
FIG. 12 is a side elevational view showing operation of the top-end supply device illustrated in FIG. 7.

As shown in FIG. 7, a table plate 150 is fixedly mounted above the turntable 112 at a position above the top-end supply station P1. As illustrated in FIGS. 1 and 8, a holder 254 has an opening or a top-end outlet 151 for holding the plurality of top ends K. The top-end outlet 151 is formed in the table plate 150 at a position immediately above the top-end supply position P1. The top-end outlet 151 in the holder 254 is larger in dimension than each of the top ends K. The holder 254 comprises four guide rods 153 which are fixedly mounted vertically to the four corners of the top-end outlet 151 respectively through attachments 152. The top ends K are stacked vertically one above the other in a space surrounded by the guide rods 153 and are movable along a direction of the stacking.

In addition, as shown in FIG. 7, a pair of cylindrical members 154 (of which only one is shown) are fixedly mounted vertically to the table plate 150, at respective positions on the inside and the outside of the turntable 112 with the top-end outlet 151 located therebetween. A cam shaft 155 is rotatably supported within each of the cylindrical members 154. The cam shafts 155 have their respective upper faces to which a pair of pulleys 156 and 156 are fixedly mounted. Above and in the vicinity of the turntable 112, a pair of feed cams 157 and 157 (refer also to FIG. 12) are arranged in spaced relation to each other and in parallel relation to the turntable 112 with the transport path L located between the pair of feed cams 157 and 157. One of the pair of feed cams 157 is arranged on the inside of the turntable 112, while the other feed cam 157 is located on the outside of the turntable 112, with the top-end outlet 151 located between the pair of feed cams 157 and 157. The pair of feed cams 157 and 157 are rotatable about their respective axes. The pair of feed cams 157 and 157 are arranged symmetrically to each other with respect to the transport path L.

The pair of feed cams 157 and 157 are made of resin material or surface-treated metal. As shown in the developed view of FIG. 11, each feed cam 157 has its outer peripheral surface in which a groove 158 inclined with respect to the front face of the feed cam 157 is formed through a predetermined length. The inclined groove 158 has a depth which is substantially equal to the height of projection of the second annular projection KD at the front face of the top end K. The inclined groove 158 extends from the front face to the rear face of the feed cam 157. The inclined groove 158 has a width into which the second annular projection KD on the front face of the top ends may be fitted. Rotation of the pair of feed cams 157 and 157 causes the second annular projection KD on the front face of a first one of the top ends K, which is located nearest the pair of feed cams 157 and 157, to be fitted simultaneously in the inclined grooves 58 formed in the outer peripheral surfaces of the respective feed cams 157.

Each of the pair of feed cams 157 has a pair of cut-outs 159 and 160 formed in the outer peripheral surface of the feed cam 157 adjacent to the front face and the rear face of the feed cam 157, respectively. The pair of cut-outs 159 and 160 extend in parallel relation to the front face of the feed cam 157 along their respective predetermined lengths. The inclined groove 158 formed in the outer peripheral surface of the feed cam 157 has one end connected to one of the pair of cut-outs 159. The other cut-out 160 is connected to the other end of the inclined groove 158.

Each of the pair of cut-outs 159 and 160 in the outer peripheral surface of the feed cam 157 has its width which is substantially equal &o that of the second annular projection KD on the front face of the top end K. The cut-out 159 or 160 has its depth substantially equal to that of the inclined groove 158 in the outer peripheral surface of the feed cam 157.

As shown in FIGS. 9 and 10, each of the pair of feed cams 157 has a pair of metal rings 161 and 163 fixedly mounted respectively to the front and rear faces of the feed cam 157. The ring 161 is retained in position by a retainer ring 162. The ring 161 has an outer periphery whose part is cut out correspondingly to the cut-out 159 formed in the outer peripheral surface of the feed cam 157. Likewise, the ring 163 has its outer periphery whose part is cut out correspondingly to the cut-out 160 formed in the outer peripheral surface of the feed cam 157.

As shown in FIGS. 7 and 8, a drive mechanism 164 is provided for rotating the pair of feed cams 157 and 157 about their respective axes. The drive mechanism 164 rotates the pair of feed cams 157 and 157 at the same rotational speed in their respective directions opposite to each other. The drive mechanism 164 comprises a pair of support cylinders 165 (only one shown) which are fixedly mounted vertically to the base 125 in adjacent relation to each other. A pair of drive shafts 167 and 167 are supported respectively within the support cylinders 165 through respective pairs of bearings 166 and 166. A pair of pulleys 168 and 168 are fixedly mounted respectively to upper ends of the drive shafts 167. A pair of endless timing belts 169 and 169 extend between and are wound about the pulleys 168 and the aforesaid pair of pulleys 156. A pair of arms 170 and 170 are mounted respectively to the upper ends of the support cylinders 165 in an angularly movable manner. A pair of rollers 171 are mounted to free ends of the respective arms 170, and are abutted respectively against the timing belts 169 by springs (not shown) to apply tension to the belts 169. On the other hand, the drive shafts 167 have their respective lower ends which are connected to a drive source 256. Thus, the drive shafts 167 are rotated by the drive source 256 at the same speed in their respective directions opposite to each other.

When the top-end supply device 141 constructed as above is in operation, the plurality of top ends K are stacked one upon the other in such a manner that the front faces of the respective top ends K are oriented upwardly. The top ends K are charged in the space defined by the guide rods 153. In this situation, when the drive source 256 is operated to rotate the pair of feed cams 157 and 157 in their respective directions opposite to each other, the second annular projection KD on one of the top ends K stacked one upon the other, which is located at the lowermost position, falls onto the cut-outs 159 in the respective feed cams 157. The top end K is once supported horizontally at the feed cams 157. At this time, the lower face of the top end K, which stands second from the bottom, is positioned at the same elevation as the metal plate 161. When the feed cams 157 are further rotated, the metal plate 161 is inserted between the lowermost top end K and the second top end K. The lowermost top end K is moved downwardly along the inclined grooves 158, while the second top end K rests on the upper face of the metal plate 161 and is maintained as it is. As processing continues, the top end K comes off from the lower end of the inclined grooves 158, and falls freely. Thus, the top end K rests on the top-end holding platforms 118 on the turntable 112. Likewise, the top ends K are fed out one by one each time the feed cams 157 rotate through one revolution.

Thus, in the top-end supply device 141 constructed as above, only rotation of the feed cams 157 at constant speed enables the stacked top ends K to be fed reliably one by one in an accurate constant cycle. Accordingly, operational reliability is extremely high. Furthermore, if the rotational speed of the feed cams 157 are changed or varied, it is possible to adjust or regulate the supply spacing or interval between the top ends K. Thus, the top-end supply device 141 can easily cope with high-speed processing of the rotating apparatus 142. Moreover, since the construction and the operation of the top-end supply device 141 are simple, the cost thereof is low, and a trouble-free operation may be anticipated.

Furthermore, in the above-described top-end supply device 141, the feed cams 157 are made of resin material or surface-treated metallic material, and the metallic plate 161 is fixedly mounted respectively on the upper faces of the feed cams 157. Accordingly, even if the top-end supply device 141 is used for a long period of time, the upper faces of the respective feed cams 157 are not worn off and, simultaneously, abutment between the inclined grooves 158 and the top ends K can be made soft. Thus, the top-end supply device 141 has such an advantage that it is difficult to damage the top ends K.

The top-end supply device 141 should not be limited to the one illustrated in FIGS. 7 through 12. For example, orientations of the respective inclined grooves 158 in the feed cams 157 may be in agreement with each other so that the feed cams 157 are rotated in the same direction. Further, the feed cams 157 should not be limited to two, but three or more feed cams may also be arranged about the top end K in equidistantly spaced relation to each other. Furthermore, the to end supply device 141 should not be limited to one which is arranged vertically. The top-end supply device 141 may be arranged in an inclined state, in a horizontal state, or in an optical orientation as necessary. In this case, it is necessary to provide means for biasing the top ends K stacked one upon the other, toward the feed cams 157, in the top-end holder 254.

The ejection device 147 located at the top-end ejection station P8 will next be described in detail with reference to FIGS. 13 through 17.

Figure 13:
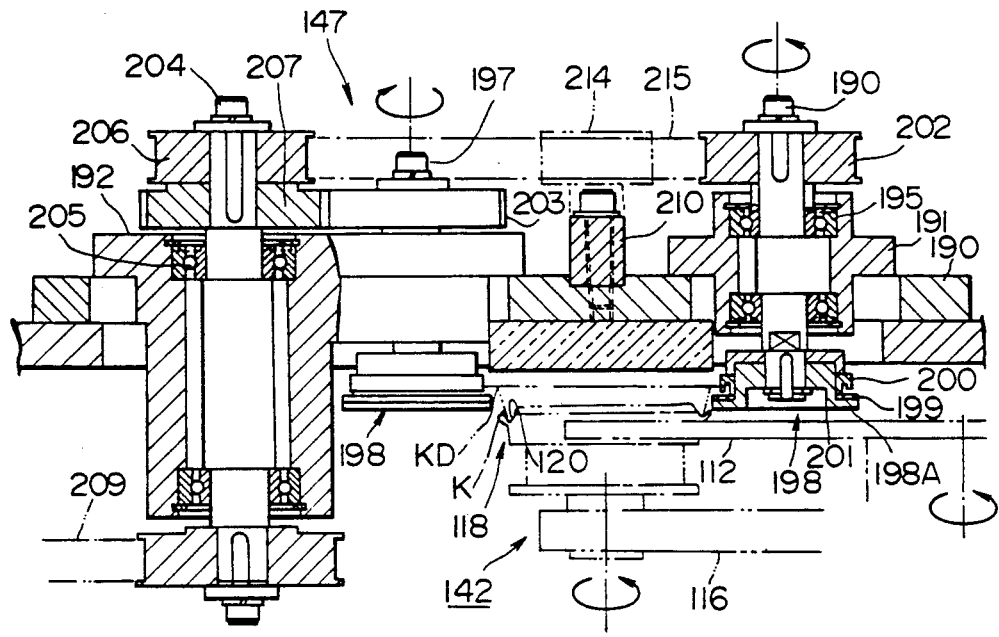
FIG. 13 is a vertical cross-sectional view of a top-end ejection device of the rotating apparatus illustrated in FIG. 1.
Figure 14:
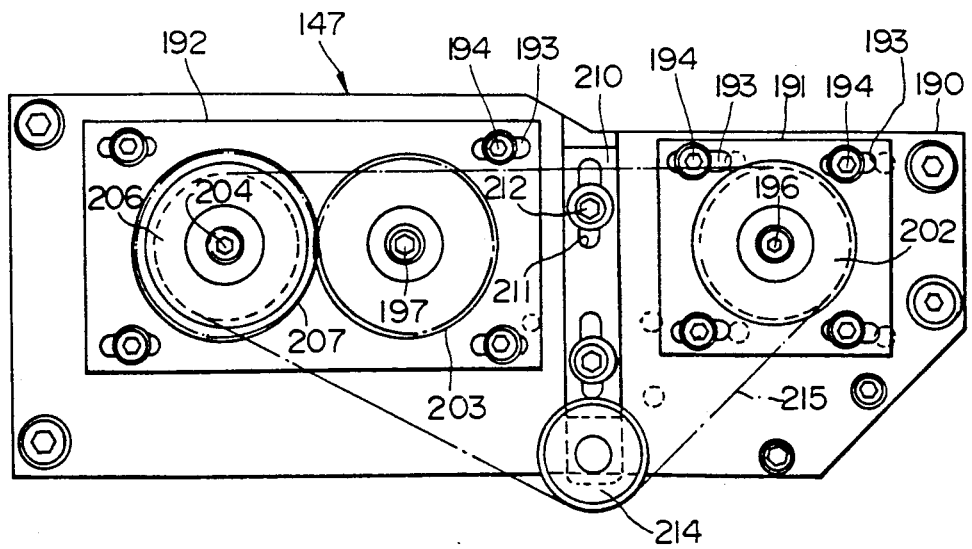
FIG. 14 is a top plan view of the top-end ejection device illustrated in FIG. 13.

As shown in FIGS. 13 and 14, a table plate 190 is arranged horizontally above the turntable 112. A pair of rectangular attaching plates 191 and 192 are arranged at their respective positions adjacent to the radial inside and the radial outside of the turntable 112 with respect to the ejection station P7. The attaching plates 191 and 192 are fixedly mounted to an upper face of the table plate 190 through a plurality of bolts 194. The bolts 194 extend respectively through elongated bores 193 which are formed respectively at four corners of the respective attaching plates 191 and 192, so that the attaching plates 191 and 192 are adjustable in their respective positions.

A pair of feed rollers 198 and 198 are arranged in spaced relation to each other and in parallel relation to the turntable 112 with the transport path L located between the pair of feed rollers 198 and 198. The pair of feed rollers 198 and 198 are rotatable about their respective axes, and have their respective outer peripheral surfaces which are so set as to simultaneously abut against the second annular projection KD on the front face of each of the top ends K. A pair of roller shafts 196 and 197 are mounted respectively to the attaching plates 191 and 192 through respective bearings 195, and vertically extend through the respective attaching plates 191 and 192. At the lower ends of the respective roller shafts 196 and 197, the pair of feed rollers 198 and 198 are fixedly mounted respectively horizontally and at the same elevation. That is, the pair of feed rollers 198 and 198 are located in equally spaced relation to the turntable 112. The feed rollers 198 are arranged on both sides of the top-end holding platform 118 which is located at the ejection station P7. That is, one of the pair of feed rollers 198 is arranged on the inside of the turntable 112, while the other feed roller 198 is arranged on the outside of the turntable 112. By the rectangular plates 191 and 192, the pair of feed rollers 198 are adjustable toward and away from each other.

As shown in FIG. 13, an annular flange 198A is formed at the outer periphery of each of the feed rollers 198 at a lower end thereof. A cushion plate 199 made of resin material is fixedly mounted to an upper face of the flange 198A, while an annular cushion member 200 is fixedly mounted to the outer peripheral surface of the feed roller 198. A slit 201 is formed in the cushion member 200. The cushion member 200 has its outer peripheral surface which is elastically or resiliently radially deformable to perform an action of adjustment or regulation of abutting pressure between the feed roller 198 and the top end K. The top end K resting on the top-end holding platform 118 located at the ejection station P7 has, at its upper face, the second annular projection KD which is supported by the cushion plate 199. The second annular projection KD is brought into elastic abutment with the outer periphery of the cushion member 200.

A pulley 202 is fixedly mounted to the upper end of the inward roller shaft 196, while a gear 203 is fixedly mounted to the upper end of the outward roller shaft 197 at a position lower than the pulley 202. On the other hand, a drive shaft 204 is vertically mounted to the outward attaching plate 192 through a bearing 205 at a position laterally of the roller shaft 197. A pulley 206 having its diameter the same as that of the pulley 202 is fixedly mounted to an upper end of the drive shaft 204 at a elevation which is the same as the pulley 202. A gear 207 in mesh with the gear 203 is also fixedly mounted to the upper end of the drive shaft 204. A drive pulley 208 is fixedly mounted to a lower end of the drive shaft 204, and is rotated through an endless belt 209 by a drive source (not shown).

An elongated attaching member 210 is mounted between the attaching plates 191 and 192 at a position above the turntable 112 by means of bolts 212 which extend respectively through elongated bores 211 so that the elongated attaching member 210 is adjustable in its position. A pulley 214 is rotatably mounted above the attaching member 210 at an elevation which is the same as the pulleys 202 and 206. An endless belt 215 is wound around these three pulleys 202, 206 and 214.

As shown in FIG. 15, at a position on the lateral side of the turntable 112, the ejection passage 148 is formed along an ejection direction of the top ends K, that is, in agreement with the rotational direction of the turntable 112. The ejection passage 148 is defined by a pair of curved side plates 217 and 217, a bottom plate 218 and a top plate 219 (refer to FIG. 17), and does not interfere with the turntable 112. Along the upper face of the turntable 112, a guide side plate 220 and a guide top plate 221 are fixedly mounted to the lower face of the table plate 112, for leading the top ends K to the ejection passage 148. As shown in FIGS. 15 and 16, a pair of guide projections 217A and 220A for supporting the lower faces of the respective top ends K are formed respectively on the lower ends of the respective guide side plate 220 and side plate 217.

During the operation of the top-end ejection device 147 constructed as above, the endless belt 209 rotates the pair of feed rollers 198 and 198 in opposite respective directions. In this situation, when the inspected top ends K rest respectively on the top-end holding platforms 118 and are conveyed to the ejection station P7 by intermittent rotation of the turntable 112, the top end K is inserted between the pair of feed rollers 198 and 198. The top end K is subjected to frictional force by the pair of feed rollers 198 and 198 in the same direction simultaneously, so that the top end K comes off from the annular groove 120 in the top-end holding platform 118 substantially at a moment and is ejected along the guide plates 220 and 221 and the ejection passage 148. Thus, regardless of the rotational speed and rotational spacing of the turntable 112, the top end K conveyed to the ejection station P7 can be reliably ejected in an extremely short time. Accordingly, the top-end ejection device 147 can easily cope with the high-speed operation of the rotating apparatus 142.

Further, since only the frictional force is applied to the outer peripheral surface of the top end K by the pair of feed rollers 198 and 198 in the tangential direction, impact at ejection of the top ends K is considerably low as compared with the conventional device in which the to ends are pushed out perpendicularly with respect to the outer peripheral surface of the top end. Thus, there is no fear that the top ends K are damaged, the second annular projection KD is concave, and so on. Moreover, since the feed rollers 198 and 198 should always be rotated at a predetermined constant speed, the construction is simple, and noise and vibration are low. Accordingly, the top-end ejection device 147 has such an advantage that the cost is low.

Furthermore, the top-end ejection device 147 also has an advantage that a difference in speed is caused to occur in rotation of the pair of feed rollers 198 and 198 as occasion demands, whereby it is possible to optionally adjust or regulate the ejection direction of the top ends K and rotation or angular movement thereof.

In the foregoing, the pair of feed rollers 198 and 198 may be so constructed as to be rotated intermittently. Moreover, a roller opening mechanism for adjusting spacing between the pair of feed rollers 198 and 198 may be arranged to selectively eject only specific top ends K.

What is claimed is:

1. A rotating apparatus for a plurality of top-ends, each of said top-ends having a first annular projection projecting in an axial direction thereof and a second annular projection projecting radially outwardly thereof, said rotating apparatus comprising:

a turntable disposed so as to be rotatable intermittently about an axis thereof and defining a transport path for said top-ends along an outer periphery thereof;

a plurality of stationary work stations arranged along said transport path in spaced relation to each other;

a plurality of top-end holding platforms arranged on the outer periphery of said turntable in circumferentially spaced relation to each other along said transport path so as to correspond to said work stations, respectively, and being movable together with said turntable about the axis thereof along said transport path, at least one of said top-end holding platforms being rotatable about an axis thereof relative to said turntable;

means for rotating said at least one top-end holding platform about the axis thereof;

each of said top-end holding platforms having an annular positioning groove formed in an upper face thereof for receiving the annular projection of the top-end;

ventilation passage means having one end opening to the upper face of said top-end holding platform; and suction-air source means connected to the other end of said ventilation passage means;

wherein each of said annular positioning grooves has opposite side faces formed so as to be equal to each other in an angle defined between each of the side faces and a center line therebetween which extends perpendicular to the upper face of a corresponding one of said top-end holding platforms.

2. A rotating apparatus according to claim 1, wherein each of said annular positioning grooves is continuous peripherally of the upper face of a corresponding one of said top-end holding platforms, and said first annular projections of the respective top ends are formed so as to be fitted respectively in said positioning grooves along entire lengths thereof.

3. A rotating apparatus according to claim 2, wherein each of said annular positioning grooves has a generally V-shape in cross-section.

4. A rotating apparatus according to claim 3, wherein each of said annular positioning grooves has a width larger than that of a corresponding one of said first annular projections of the respective top ends.

5. A rotating apparatus according to claim 1, wherein the center line between the side faces of each of said annular positioning grooves is in agreement with a center line of the first annular projection of a corresponding one of said top ends.

6. A rotating apparatus according to claim 1, wherein an angle defined between the side faces of each of said annular positioning grooves is about 70° through 100°.

7. A rotating apparatus according to claim 1, wherein said turntable is arranged horizontally, and the upper faces of the respective top-end holding platforms extend parallel to said turntable, and wherein said top-end holding platforms are arranged in equidistantly spaced relation to each other on the outer periphery of said turntable along said transport path.

8. A rotating apparatus according to claim 1, wherein said work stations includes a top-end supply station, a top-end ejection station and at least one top-end inspection station, and wherein said drive means is constructed so as to rotate the top-end holding platform which is located a said at least one top-end inspection station while keeping the top-end holding platforms, which are located at said top-end supply station and said top-end ejection station, stationary.

9. A rotating apparatus according to claim 1, further including a base, which is stationary relative to said turntable and is arranged about the axis of said turntable, and a ventilating member fixedly mounted to said base, said ventilating member being held in abutment with said turntable, wherein said ventilation passage means comprises an air passage formed in said turntable and having one end opening to the upper face of the top-end holding platform which is located at said at least one top-end inspection station, and a groove formed in an end face of said ventilating member and communicating with the other end of said air passage, whereby said suction-air source means communicates with the upper face of the top-end holding platform located at said at least one top-end inspection station, through said groove and said air passage.

10. A rotating apparatus according to claim 9, wherein said groove formed in the end face of said ventilating member is a C-shape in plan and extends about the axis of said turntable.

11. A rotating apparatus according to claim 1, wherein said work stations include a top-end supply station, and further comprising a top-end supply device located at said top-end supply station, said top-end supply device comprising:
holder means having a top-end outlet for holding said plurality of top ends in such a manner that said top ends are stacked upon each other and are movable along a direction of the stacking;
a plurality of feed-cam means arranged in spaced relation to each other and in parallel relation to said turntable with said transport path located between said plurality of feed-cam means, said feed-cam means being rotatable about their respective axes and having their respective front and rear faces; and
rotating means for rotating said plurality of feed-cam means about their respective axes,
wherein said plurality of feed-cam means have their respective outer peripheral surfaces in which a plurality of grooves inclined with respect to the front faces of the respective feed-cam means are formed respectively, each of said inclined grooves extending from the front face to the rear face of a corresponding one of said plurality of feed-cam means and having a width in which the second annular projection of a corresponding one of said top ends is fitted, whereby rotation of said plurality of feed-cam means causes the second annular projection of a first one of said top ends, which is located nearest said plurality of feed-cam means, to be fitted simultaneously in said inclined grooves formed in the outer peripheral surfaces of the respective feed-cam means.

12. A rotating apparatus according to claim 11, wherein one of said plurality of feed-cam means is arranged on the inside of said turntable, while another of said plurality of feed-cam means is located on the outside of said turntable, with said top-end outlet located between on and another of said plurality of feed-cam means.

13. A rotating apparatus according to claim 11, wherein each of said inclined grooves has its depth which is substantially equal to an amount of projection of the second annular projection at the front face of a corresponding one of said top ends.

14. A rotating apparatus according to claim 11, wherein each of said plurality of feed-cam means has a pair of cut-outs formed in the outer peripheral surface so as to be adjacent to the front and rear faces of the feed-cam means, respectively, the pair of cut-outs extending in parallel relation to the front face of the feed-cam means, the inclined groove formed in the outer peripheral surface of the feed-cam means having one end connected to one of said pair of cut-outs, the other cut-out being connected to the other end of the inclined groove.

15. A rotating apparatus according to claim 14, wherein each of said pair of cut-outs in the outer peripheral surface of each of said plurality of feed-cam means has a width which is substantially equal to that of the second annular projection of a corresponding one of said top ends, and the cut-out having a depth substantially equal to that of the inclined groove in the outer peripheral surface of the feed-cam means.

16. A rotating apparatus according to claim 14, wherein each of said plurality of feed-cam means has a pair of metal rings fixedly mounted respectively to the front and rear faces of the feed-cam means, said pair of metal rings having their respective outer peripheries whose parts are cut out correspondingly respectively to the pair of cut-outs formed in the outer peripheral surface of the feed-cam means.

17. A rotating apparatus according to claim 13, including a pair of feed-cam means arranged symmetrically to each other with respect to said transport path.

18. A rotating apparatus according to claim 17, wherein said rotating means is constructed so as to rotate said pair of feed-cam means at the same rotational speed in their respective directions opposite to each other.

19. A rotating apparatus according to claim 11, wherein each of said plurality of feed-cam means is made of one of resin material and surface-treated metal.

20. A rotating apparatus according to claim 11, wherein said turntable is arranged horizontally.

21. A rotating apparatus according to claim 1, wherein said work stations include a top-end ejection station, and further comprising a top-end ejection device located at said top-end ejection station, said top-end ejection device comprising:
ejection passage means arranged stationary relative to said turntable at a position adjacent to said top-end ejection station;
a pair of feed-roller means arranged in spaced relation to each other and in parallel relation to said turntable with said transport path located between said pair of feed-roller means, said pair of feed-roller means being rotatable about their respective axes, said pair of feed-roller means having their respective outer peripheral surfaces which are so set as to be abutted simultaneously against the second annular projection on the front face of each of said top ends; and
rotating means for rotating said pair of feed-roller means in their respective directions opposite to each other, whereby rotation of said pair of feed-roller means causes the top end, which is located at said top-end ejection station, to be ejected into and along said ejection passage means.

22. A rotating apparatus according to claim 21, wherein said turntable is arranged horizontally.

23. A rotating apparatus according to claim 21, wherein one of said pair of feed-roller means is arranged on the inside of said turntable, while the other feed-roller means is arranged on the outside of said turntable.

24. A rotating apparatus according to claim 21, wherein said pair of feed-roller means are adjustable toward and away from each other.

25. A rotating apparatus according to claim 21, further comprising a pair of cushioning means arranged respectively about outer peripheral surfaces of the respective feed-roller means.

26. A rotating apparatus according to claim 21, wherein said ejection passage means extends tangentially of said transport path.

* * * * *